(12) United States Patent
Ro et al.

(10) Patent No.: US 11,436,477 B2
(45) Date of Patent: Sep. 6, 2022

(54) METHOD AND APPARATUS WITH DATA PROCESSING

(71) Applicants: Samsung Electronics Co., Ltd, Suwon-si (KR); Seoul National University R&DB Foundation, Seoul (KR)

(72) Inventors: Yuhwan Ro, Seongnam-si (KR); Byeongho Kim, Seoul (KR); Jaehyun Park, Busan (KR); Jungho Ahn, Seoul (KR); Minbok Wi, Seoul (KR); Sunjung Lee, Geoje-si (KR); Eojin Lee, Suwon-si (KR); Wonkyung Jung, Suwon-si (KR); Jongwook Chung, Seoul (KR); Jaewan Choi, Incheon (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 269 days.

(21) Appl. No.: 16/857,740

(22) Filed: Apr. 24, 2020

(65) Prior Publication Data
US 2021/0117761 A1 Apr. 22, 2021

(30) Foreign Application Priority Data
Oct. 16, 2019 (KR) .......................... 10-2019-0128714

(51) Int. Cl.
*G06N 3/063* (2006.01)
*G06N 3/08* (2006.01)
*G06N 20/10* (2019.01)
*G06F 17/16* (2006.01)
*G06F 9/38* (2018.01)
*G06F 9/30* (2018.01)

(52) U.S. Cl.
CPC ............ *G06N 3/063* (2013.01); *G06F 9/3001* (2013.01); *G06F 9/30145* (2013.01); *G06F 9/3802* (2013.01); *G06F 17/16* (2013.01); *G06N 3/082* (2013.01); *G06N 20/10* (2019.01)

(58) Field of Classification Search
None
See application file for complete search history.

(56) References Cited

U.S. PATENT DOCUMENTS 8,078,637 B1 * 12/2011 Polyudov .............. G06F 9/4403
707/899
9,830,302 B1 11/2017 Rub
(Continued)

OTHER PUBLICATIONS

Bell, N.. et al., Implementing Sparse Matrix-Vector Multiplication on Throughput-Oriented Processors, 2009, ACM, 11 pages. (Year: 2009).*

(Continued)

*Primary Examiner* — Eric Coleman
(74) *Attorney, Agent, or Firm* — NSIP Law

(57) ABSTRACT

A processor-implemented data processing method includes: generating compressed data of first matrix data based on information of a distance between valid elements included in the first matrix data; fetching second matrix data based on the compressed data; and generating output matrix data based on the compressed data and the second matrix data.

20 Claims, 9 Drawing Sheets

(56) References Cited

U.S. PATENT DOCUMENTS

| | | | |
|---|---|---|---|
| 9,843,341 B1 | 12/2017 | Yang | |
| 2014/0258689 A1* | 9/2014 | Song | G06F 9/3001 |
| | | | 712/221 |
| 2015/0199266 A1 | 7/2015 | Franchetti et al. | |
| 2015/0242690 A1* | 8/2015 | Richert | G06N 3/08 |
| | | | 382/103 |
| 2018/0246855 A1* | 8/2018 | Redfern | G06F 3/0613 |
| 2018/0293758 A1* | 10/2018 | Bar-On | G06N 3/0454 |
| 2018/0322382 A1 | 11/2018 | Mellempudi et al. | |

OTHER PUBLICATIONS

Kim, Duckhwan et al., "Neurocube: A Programmable Digital Neuromorphic Architecture with High-Density 3D Memory", *2016 ACM/IEEE 43rd Annual International Symposium on Computer Architecture*, 2016 (pp. 380-392).

Gao, Mingyu et al., "TETRIS: Scalable and Efficient Neural Network Acceleration with 3D Memory", *ACM SIGARCH Computer Architecture News*, Apr. 2017 (pp. 751-764).

Shin, Hyunsung et al., "McDRAM: Low Latency and Energy-Efficient Matrix Computations in DRAM", *IEEE Transactions on Computer-Aided Design of Integrated Circuits and Systems*, vol. 37, Issue 11, Nov. 2018 (pp. 2613-2622).

\* cited by examiner

METHOD AND APPARATUS WITH DATA PROCESSING

CROSS-REFERENCE TO RELATED APPLICATION

This application claims the benefit of Korean Patent Application No. 10-2019-0128714, filed on Oct. 16, 2019, in the Korean Intellectual Property Office, the disclosure of which is incorporated herein in its entirety by reference.

BACKGROUND

1. Field

The present disclosure relates to methods and apparatuses with data processing.

2. Description of Related Art

Neural networks may refer to a computer scientific computational architecture. Input data may be analyzed and valid information extracted by using a neural network device in various kinds of electronic systems.

When performing an arithmetic computation on input data and a weight matrix in order to extract valid information, a typical neural network may not efficiently process the computation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented data processing method includes: generating compressed data of first matrix data based on information of a distance between valid elements included in the first matrix data; fetching second matrix data based on the compressed data; and generating output matrix data based on the compressed data and the second matrix data.

The valid elements included in the first matrix data may be elements having nonzero values.

The generating of the compressed data may include: generating the compressed data so that information of a first valid element, among elements included in a same row of the first matrix data, is included in the compressed data; and generating the compressed data so that information of a second valid element, among the elements included in the same row of the first matrix data, is included in the compressed data.

The first valid element may be an element having a smallest column address among valid elements included in the same row.

The generating of the compressed data so that information of the first valid element is included in the compressed data may include allocating element value information and column address information of the first valid element to the compressed data, and the generating of the compressed data so that information of the second valid element is included in the compressed data may include allocating element value information of the second valid element and column distance information, indicating a column distance from the second valid element to a valid element having a smaller column address than a column address of the second valid element, to the compressed data.

The first valid element may be the valid element having the smaller column address than the second valid element.

The generating of the compressed data may include generating the compressed data so that the row address of the first valid element is included in the compressed data.

The generating of the compressed data so that the row address of the first valid element is included in the compressed data may include allocating row address information of the first valid element and an identification bit indicating an end of a row including the first valid element to the compressed data.

The method may include storing the generated compressed data so that the valid elements of the first matrix data are configured to be read in units of rows.

The storing of the compressed data may include: partitioning the compressed data into rows; and respectively storing pieces of the partitioned compressed data in first regions of a plurality of banks.

The storing of the compressed data further may include copying portions of the pieces of the partitioned compressed data stored in the first regions and storing the portions in a second region of one of the plurality of banks.

The fetching of the second matrix data may include: obtaining row address and column address information of the valid elements from the compressed data; and fetching element value information of the second matrix data corresponding to the obtained row address and column address.

The obtaining of the row address and column address information may include: obtaining column address information of a first valid element stored in the compressed data, and obtaining column address information of a second valid element by summing column distance information stored in the compressed data with column distance information of a valid element having a smaller column address than a column address of the second valid element.

The generating of the compressed data may include performing a multiply and accumulation (MAC) operation using the compressed data and the second matrix data.

The first matrix data may correspond to kernel weight data and the second matrix data may correspond to feature map data.

A non-transitory computer-readable storage medium may store instruction that, when executed by one or more processors, configure the one or more processors to perform the method.

In another general aspect, a data processing apparatus includes a memory; and one or more processors configured to: generate compressed data of first matrix data based on information of a relative distance between valid elements included in the first matrix data; fetch an input vector based on the compressed data; and generate output matrix data based on the compressed data and the second matrix data.

For the generating of the compressed data, the one or more processors may be configured to: generate the compressed data so that information of a first valid element, among elements included in a same row of the first matrix data, is included in the compressed data; generate the compressed data so that information of a second valid element, among the elements included in the same row of the first matrix data, is included in the compressed data; and generate the compressed data so that a row address of the first valid element is included in the compressed data.

The generating of the compressed data so that information of the first valid element is included in the compressed data may include allocating element value information and column address information of the first valid element to the compressed data, the generating of the compressed data so that information of the second valid element is included in the compressed data may include allocating element value information of the second valid element and column distance information, indicating a column distance from the second valid element to a valid element having a smaller column address than a column address of the second valid element, to the compressed data, and the generating of the compressed data so that the row address of the first valid element is included in the compressed data may include allocating row address information of the first valid element and an identification bit indicating an end of a row including the first valid element to the compressed data.

The memory may be configured to store the generated compressed data so that the valid elements of the first matrix data may be configured to be read in units of rows.

For the storing of the compressed data, the memory may be configured to: partition the compressed data into units of rows; and respectively store the pieces of the partitioned compressed data in first regions of a plurality of banks.

For the storing of the compressed data, the memory may be configured to copy portions of the pieces of the partitioned compressed data stored in the first regions and store the portions in a second region of one of the plurality of banks.

The one or more processors may be configured to: obtain row addresses and column address information of the valid elements from the compressed data; and fetch element value information of the second matrix data corresponding to the obtained row address and column address.

The one or more processors may be configured to perform a multiply and accumulation (MAC) operation using the compressed data and the input vector.

The apparatus may include a memory storing instructions that, when executed by the one or more processors, configure the one or more processors to perform the generating of the compressed data of the first matrix data, the fetching of the second matrix data, and the generating of the output matrix data.

The apparatus may be any one of a personal computer (PC), a server device, a mobile device, a smart phone, a tablet device, an augmented reality (AR) device, an internet-of-things (IoT) device, an autonomous vehicle, a robotics device, and a medical device, and the one or more processors may be configured to perform any one of voice recognition, vision recognition, and image classification based on a result of the processing of the data.

Other features and aspects will be apparent from the following detailed description, the drawings, and the claims.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
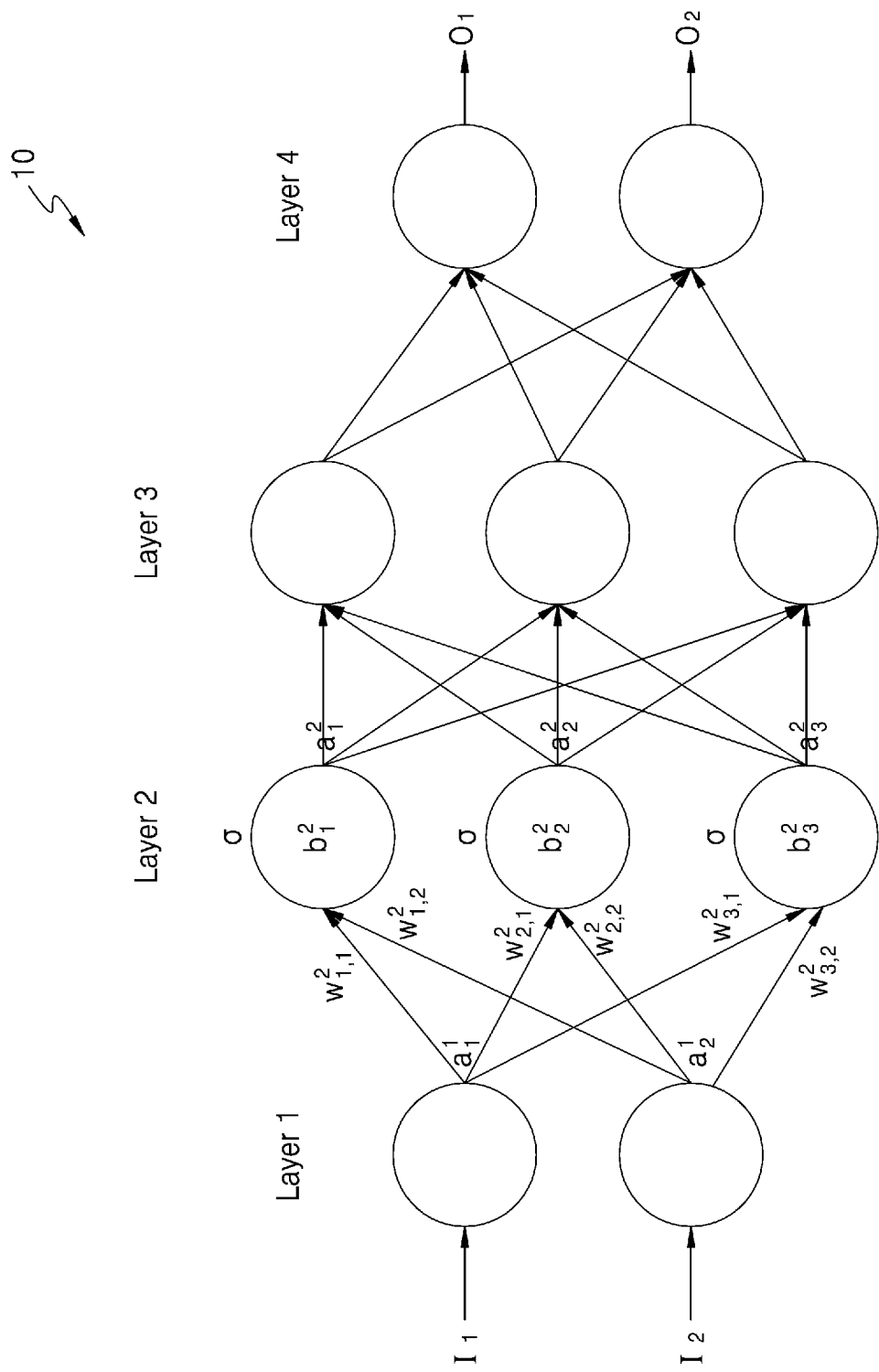
FIG. 1 illustrates a neural network according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Reference will now be made in detail to embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. Also, in the specification, the term "units" or " . . . modules" denote units or modules that process at least one function or operation, and may be realized by hardware or a combination of hardware and software.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Reference will now be made in detail to the following embodiments, examples of which are illustrated in the accompanying drawings. The embodiments may, however, be embodied in many different forms and should not be construed as being limited to the following description.

FIG. 1 illustrates a neural network (e.g., neural network 10) according to one or more embodiments.

Thus, as illustrated in FIG. 1, the neural network 10 may have a structure including an input layer, hidden layers, and an output layer. The neural network 10 may perform computations based on received input data (for example, $I_1$ and $I_2$), and may generate output data (for example, $O_1$ and $O_2$) based on the result of the computations.

The neural network 10 may be a deep neural network (DNN) including two or more hidden layers or an n-layers neural networks. For example, as shown in FIG. 1, the neural network 10 may be a DNN including an input layer (Layer 1), two hidden layers (Layer 2 and Layer 3), and an output layer (Layer 4). The DNN may include any combination of a fully connected neural network, a convolutional neural network (CNN), a recurrent neural network (RNN), a feedforward neural network (FNN), Deep Belief Networks, Restricted Boltzmann Machines, and the like, but is not limited thereto.

The neural network 10 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a big data set, as non-limiting examples. The deep learning may be implemented by mapping of input data and the output data through supervised or unsupervised learning or training, such that when trained the resultant machine learning model, engine, or example NN may intuitively map further input data to output data with a desired accuracy or reliability. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The neural network 10 may include fewer or more layers. Also, the neural network 10 may include layers of various structures different from those shown in FIG. 1.

Each of the layers included in the neural network 10 may include a "node", a "processing element (PE)", a "neuron" or, known as similar terms, a plurality of artificial neurons. While the nodes may be referred to as "neurons" or "artificial neurons," such reference is not intended to impart any relatedness with respect to how the neural network architecture computationally maps or thereby intuitively recognizes information and how a human's neurons operate. I.e., the terms "neuron" and "artificial neuron" are merely a term of art referring to the hardware implemented nodes of a neural network. As shown in FIG. 1, Layer 1 may include two neurons and Layer 2 may include three neurons, for example. However, this is only an example, and each of the layers included in the neural network 10 may include various numbers of neurons.

Neurons included in different layers included in the neural network 10 may be connected or linked to one other, and thus, may exchange data. For example, a neuron of a layer may receive data from neurons of a previous layer and compute on the data, and may output the computation result to neurons of a next layer. Additionally, in a recurrent connection example, one neuron in a layer may receive data from itself, and/or from another neuron of the layer, from a previous time. The number of the connections may correspond to the number of the neurons included in the subsequent layer. For example, in adjacent fully connected layers, each neuron of a current layer may have a respective connection to each neuron of the subsequent layer, noting that in some examples such full connections may later be pruned or minimized during training or optimization.

An output value of each of the neurons may be referred to as an activation, or a value which results from such a predetermined activation function of the corresponding neuron. The activation may be thus be an output value of one neuron and an input value of neurons included in a next layer, due to corresponding connection(s) with the next layer. Each of the neurons may determine its own activation value based on resultant activations and weights received from neurons included in the previous layer. A weight is a parameter used to calculate activation in each neuron, and may be a value allocated to a connection relationship between neurons. Weights may be stored at synapses that connect neurons. For example, an output from a previous layer's neuron may be provided to as an input to a neuron of a next or subsequent layer through a weighted connection between the previous layer's neuron and the neuron of the next layer, with the weight of the weighted connection being variously adjusted during the training of the neural network until the neural network is trained for a desired objective. There may be additional connections to the neuron of the next layer, such as for providing a bias connection value through a connection that may or may not be weighted and/or for providing the above example recurrent connection which may be weighted. During training and implementation such connections and connection weights may be selectively implemented, removed, and varied to generate or obtain a resultant neural network that is thereby trained and that may be correspondingly implemented for the trained objective, such as for any of the above example recognition objectives.

Accordingly, returning to FIG. 1, each of the neurons may be a computational unit that outputs a resulting activation by receiving an input (e.g., through such weighted connections), and may thereby map an input-output. The computational unit may correspond to the activation function for a node. As a non-limiting example, when a is an activation function, $w_{jk}^{i}$ is a weight to a $j^{th}$ neuron included in an $i^{th}$ layer from a $k^{th}$ neuron included in $(i-1)^{th}$ layer, $b_j^i$ is a bias of the $j^{th}$ neuron included in the $i^{th}$ layer, and $a_j^i$ is an activation of the $j^{th}$ neuron of the $i^{th}$ layer, the activation $a_j^i$ may follow Equation 1 below.

$$a_j^i = \sigma\left(\sum_k (w_{jk}^i \times a_k^{i-1}) + b_j^i\right) \quad \text{Equation 1}$$

As illustrated in Equation 1, the neural network computation may include a multiplication computation of multiplying an output value of a neuron of the previous layer ($a_k^{i-1}$) and a weight of a synapse ($w_{jk}^i$), and an addition operation of adding the result values of each multiplication in the receiving neuron.

In a typical neural network, a large number of data sets may be exchanged between a plurality of interconnected channels, and a number of computational processes may be performed through layers. However, in attempting to reduce the amount of computations for processing complex input data, the typical neural network may only consider the position or type of the calculator, and there is a technological problem in that the typical neural network may not implement a computation method that considers the sparsity characteristic of a weight matrix. However, a neural network of one or more embodiments may implement a method of generating compressed data of a weight matrix and a method of calculating a weight matrix and input data considering the sparsity characteristic of the weight matrix, thereby solving such a technological problem and providing a technological improvement by advantageously considering the sparsity characteristic of the weight matrix and thereby further reducing the amount of computations for processing input data over the typical neural network, as will be described.

Figure 2:
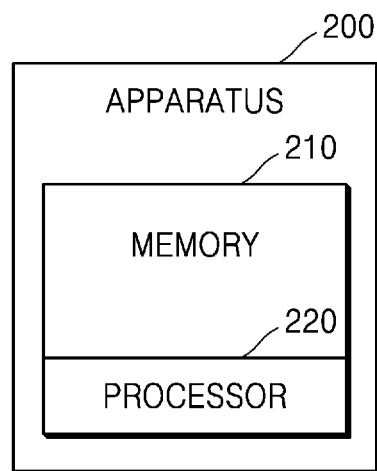
FIG. 2 illustrates a data processing apparatus according to one or more embodiments.

FIG. 2 illustrates a data processing apparatus 200 according to one or more embodiments.

Referring to FIG. 2, the data processing apparatus 200 may include a memory 210 and a processor 220 (e.g., one or more processors). It will be understood to one of ordinary skill in the art after an understanding of the present disclosure that other general-purpose components may further be included in the data processing apparatus 200 in addition to the components shown in FIG. 2.

The data processing apparatus 200 may be a device in which a neural network (e.g., the neural network of FIG. 1) is implemented. For example, the data processing apparatus 200 may be implemented as, or with, various kinds of devices such as a personal computer (PC), a server, a mobile device, an embedded device, etc. As a specific example, the data processing apparatus 200 may be, or be included in, a smart phone, a tablet device, an Augmented Reality (AR) device, an Internet of Things (IoT) device, autonomous vehicles, robotics, medical devices, etc. that performs voice recognition, image recognition, image classification, etc. by using any one or any combination of the neural network layers and/or neural networks made up of one or more of the layers of nodal convolutional interactions discussed herein, but is not limited thereto. Also, the data processing apparatus 200 may be a dedicated hardware accelerator (HW accelerator) mounted in the above-described devices, and may be a HW accelerator, such as a neural processing unit (NPU), a tensor processing unit (TPU), and a Neural Engine, etc. which may be dedicated modules for driving neural networks. The use of the term "may" herein with respect to an example or embodiment (e.g., as to what an example or embodiment may include or implement) means that at least one example or embodiment exists where such a feature is included or implemented, while all examples are not limited thereto.

The memory 210 may store various data processed in the data processing apparatus 200. For example, the memory 210 may store data processed by the data processing apparatus 200 and data to be processed. Also, the memory 210 may store applications, drivers, etc. to be driven by the data processing apparatus 200.

For example, the memory 210 may include random access memory (RAM), such as dynamic random access memory (DRAM), static random access memory (SRAM), read-only memory (ROM), and electrically erasable programmable read-only memory (EEPROM), CD-ROM, Blu-ray or other optical disk storage, hard disk drive (HDD), solid state drive (SSD), or flash memory.

The processor 220 may control overall functions for implementing or driving the neural network in the data processing apparatus 200. For example, the processor 220 may control the data processing apparatus 200 by executing programs (or instructions) stored in the memory 210. In an embodiment, the processor 220 may be arranged in the memory 210 and implemented in the form of a processing in memory (PIM).

The processor 220 may read/write data (for example, image data, feature map data, kernel data, etc.) from the memory 210 and perform a PIM operation using the read/write data. The PIM operation may denote a computation operation including at least one of arithmetic operations, such as addition, multiplication, and accumulation, and logical operations, such as AND, OR, and XOR. In an example, when the data processing apparatus 200 is used to implement a Recurrent Neural Network (RNN), the PIM operation may be a matrix vector multiplication (MV-Mul) operation.

The processor 220 may include a computation circuit to perform a PIM operation. The computation circuit may denote hardware that performs a computation task in the memory 210. Each computation circuit may be implemented as an array of multiple logic gates, or may be implemented as a combination of an array of logic gates and a buffer that temporarily stores data.

According to an embodiment, the data processing apparatus 200 may include a plurality of memories 210, and the processor 220 may be provided in each of the memories 210. In this case, the memory 210 may store data in a bank, and the processor 220 corresponding to each memory 210 may read the data from the bank to perform a computation. In addition, the processor 220 may again write the result of the computation to the corresponding bank.

When a typical processor performs a multiplication operation between data (for example, a multiplication operation between matrices, a multiplication operation between a matrix and a vector, and a multiplication operation between vectors, etc.), if invalid information is included in data to be computed, the computation may be unnecessary. For example, the invalid information may be expressed as '0', and when any one of the data to be computed is 0, the multiplication computation between the data is output as 0, and it only increases the amount of computations.

In order to solve such a problem, the typical processor may reduce an access frequency of a memory by using a single instruction multiple data (SIMD) MAC unit to process the operation of a partitioned region after partitioning DRAM dies or by disposing an accumulation operation of the MAC unit close to a DRAM bank. However, for the typical processor, to achieve the type change and location change of such MAC unit, there is a technological problem in that a costly and time consuming design/configuration of such MAC unit may be required. On the contrary, the data processing apparatus 200 according to one or more embodiments may compress data considering a sparsity characteristic of the data to be processed, and generate output data based on the compressed data, and thus, the data processing apparatus 200 according to one or more embodiments may solve such a technological problem by significantly reducing the amount of computations without requiring the costly and time consuming design/configuration of such MAC unit.

Hereinafter, referring to FIGS. 3 through 9, examples of compressing data considering the sparsity characteristic of the data and generating output data based on the compressed data by the data processing apparatus 200 will be described.

Figure 3:
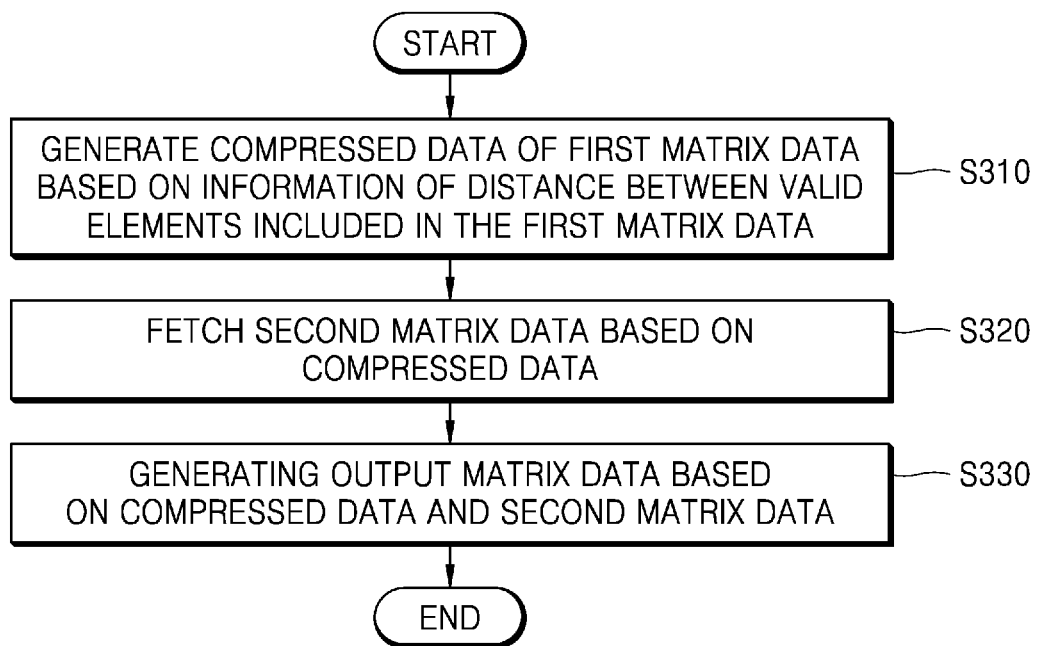
FIG. 3 illustrates a method of processing data according to one or more embodiments.

FIG. 3 illustrates a method of processing data according to one or more embodiments.

Referring to FIG. 3, the method of processing data may include operations processed in a time series by the data processing apparatus 200 of FIG. 2. Accordingly, it may be seen that the descriptions given with respect to the data processing apparatus 200 depicted in FIG. 2 may also apply to the method of processing data of FIG. 3.

In operation S310, the processor 220 may generate compressed data of first matrix data based on information representing a relative distance between valid elements included in the first matrix data.

The first matrix data may denote data in which element values to be used in a multiplication operation between the data are expressed in a matrix form. The first matrix data may include at least one row. The first matrix may include a vector matrix. In an embodiment, the first matrix data may be a weight matrix in which a weight, which is an element value of a kernel (e.g., a kernel or filter to be used in a convolution operation), is expressed in a matrix form. Hereinafter, for convenience of explanation, the first matrix data may be described as being a weight matrix, but is not limited thereto.

A weight may be stored in the memory 210 in a matrix form as a parameter used to calculate activation in each neuron. Elements included in the weight matrix may respectively include weight value information and address information.

The weight value may denote a value allocated based on a connection relationship between neurons. The larger the weight value, the stronger the connectivity between the corresponding two nodes may be, and the smaller the weight value, the weaker the connectivity between the corresponding two nodes may be. A weight value may have a value between 0 and 10, for example, but is not limited thereto.

Address information may include row address information and column address information. The address information may be used for fetching an input vector and may be information indicating the position of a weight value in a weight matrix.

In an embodiment, a valid element may denote data on which a meaningful Matrix Vector Multiplication (MV-Mul) operation may be performed. A "meaningful" MV-Mul operation may be an MV-Mul operation in which a resulting output vector is other than '0'. If any weight value in the weight matrix is '0', the element of the corresponding output vector is zero. Accordingly, a valid element may denote an element having a weight value other than '0'. In other words, an invalid element, which is meaningless to a matrix vector multiplication operation, may denote an element having a weight value of '0', and is "meaningless" because the element of the corresponding output is zero.

The processor 220 may generate compressed data so that only information of valid elements is included in the compressed data (e.g., by generating compressed data so that information of invalid elements is excluded in the compressed data). In a neural network, when the weight matrix has a high sparsity characteristic, the data processing apparatus 200 according to one or more embodiments has an advantage in that the amount of computations of a matrix vector multiplication operation may be significantly reduced.

In the present disclosure, the sparsity may denote whether data has a space or the state of data that contains a space. Here, the term "space" may indicate an element having a value of '0' is disposed between elements having values other than '0' in a row or column direction of a weight matrix. As described above, a valid element in a weight matrix may be represented by data that is a number other than '0'. Thus, data of '0' denotes meaningless information, which may also be interpreted as that the corresponding data is blank (that is, no data).

The processor 220 may generate compressed data of a weight matrix based on information representing a relative distance between the valid elements. The relative distance may represent a column distance between valid elements. For example, when a column address of a first valid element is 2 and a column address of a second valid element is 6, a relative distance between the first valid element and the second valid element may be 4. When the second valid element is compressed, the processor 220 may input 4 in address information of the second valid element instead of 6, which is a column address. The address information may be represented by an index bit. Since the processor 220 may input column distance information rather than column address information into the compressed data, a total size of the compressed data may be significantly reduced, thereby solving such a technological problem in an example by reducing the amount of computations for processing input data compared to the typical neural network.

The processor 220 may generate compressed data so that a weight value of a valid element and column distance information from a current valid element to a previous valid element are included in the compressed data. Also, the processor 220 may generate compressed data so that a row address of a valid element and an identification bit indicating the end of the row are included in the compressed data. An example of generating compressed data by the processor 220 will be described below with reference to FIG. 4.

After operation S310, the method may further include storing the generated compressed data so that the valid elements of the weight matrix may be read in units of rows.

The processor 220 may partition the compressed data into rows and may respectively store the partitioned compressed data in a first region of a plurality of banks. Since the data processing apparatus 200 according to one or more embodiments may be implemented in a PIM form, when pieces of compressed data are separately stored in a plurality of banks, and each processor 220 separately computes a matrix vector multiplication operation, there is an advantage that a fast matrix vector multiplication operation may be performed.

On the other hand, when the distribution of valid elements included in a weight matrix is irregular, the valid elements may be concentrated in any one bank. The processor 220 may obtain an effect of load balancing by copying a part of the compressed data and storing it in a second region of any one of the plurality of banks. In other words, a load may be distributed in a balanced manner by allowing a bank that has already completed ahead a matrix vector multiplication operation of allocated valid elements to perform a matrix vector multiplication operation instead of another bank, which has not completed the matrix vector multiplication operation. An example of storing compressed data by the processor 220 will be described below with reference to FIGS. 5 through 7.

In operation S320, the processor 220 may fetch second matrix data based on the compressed data.

The second matrix data may denote data in which element values used in a multiplication operation between the data are expressed in a matrix form. The second matrix may include a vector matrix. In an embodiment, the second matrix data may denote feature map data (e.g., feature map data to be used in a convolution operation). Hereinafter, for the convenience of explanation, the second data may be described based on the feature map data, but is not limited thereto.

The feature map data may be input feature map data or output feature map data. In other words, the output feature map data in a previous layer may be input feature map data in a next layer. Accordingly, the second matrix data of operation S320 may be input feature map data or output feature map data. The second matrix data may be expressed in the form of a column vector or a row vector.

The processor 220 may obtain row addresses and column addresses of valid elements from the compressed data. In operation S310, when the processor 220 generates the compressed data of the first matrix data based on the information representing a relative distance between the valid elements, the processor 220 may obtain a column address by summing column distance information of the current valid element and column distance information of the previous valid element. Also, the processor 220 may obtain a row address of the current valid element based on an identification bit. The processor 220 may fetch second matrix data corresponding to the obtained row address and column address.

In operation S330, the processor 220 may compute output data by using the compressed data and the second matrix data. In an example, the output data may correspond to an output of a convolution operation between the first matrix data corresponding to a kernel and the second matrix data corresponding to a feature map.

The processor 220 may compute output data by performing a MAC operation on the fetched second matrix data and valid elements. The output data may be expressed in vector form. Each of the output vectors may be summed through an adder tree and stored in the memory 210 as output data. An example of performing a MAC operation by the processor 220 will be described below with reference to FIGS. 8 through 9.

Figure 4:
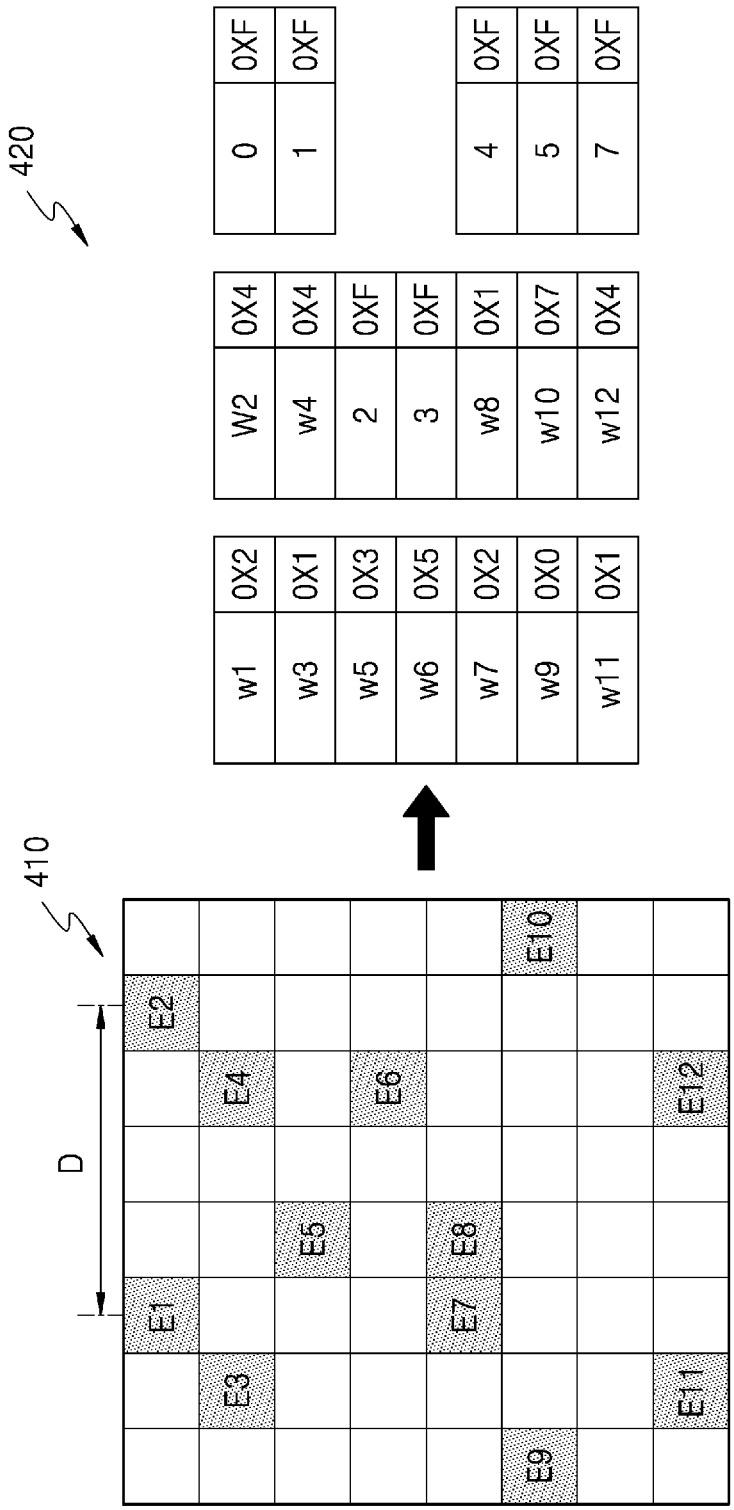
FIG. 4 illustrates a method of compressing data by a processor according to one or more embodiments.

FIG. 4 illustrates a method of compressing data by a processor according to one or more embodiments.

FIG. 4 shows first matrix data 410 and compressed data 420. Although the first matrix data 410 of FIG. 4 is illustrated as a matrix having 8 rows and 8 columns, the first matrix data 410 is not limited thereto, and the first matrix data 410 may have any number of rows and columns. For example, the first matrix data 410 may be expressed by a column vector of one row and n columns.

Referring to FIG. 4, the first matrix data 410 may include a plurality of valid elements E1 through E12. Each of the valid elements E1 through E12 may have an element value other than '0'.

The processor 220 may generate compressed data so that information of a first valid element among elements included in a same row of the first matrix data 410 is included in the compressed data 420 according to a first rule.

As an example, the first valid element may denote the first valid element of each row. In an embodiment, the first valid element may denote a valid element having the smallest column address among valid elements included in the same row. For example, the first valid elements in FIG. 4 may be E1, E3, E5, E6, E7, E9, and E11. In another embodiment, the first valid element may denote a valid element having the largest column address among the valid elements included in the same row. For example, the first valid elements in FIG. 4 may be E2, E4, E5, E6, E10, and E12.

The first rule may be a rule for allocating element value information and column address information of the first valid element to compressed data. For example, in FIG. 4, the processor 220 may allocate w1 (which is an element value of E1) and 2 (which is column address information) to the compressed data. The processor 220 may express the column address information in the form of an index bit, and when the index bit is set to 4 bits, the processor 220 may thus express the column address of E1 as 0X2.

The processor 220 may generate compressed data so that information of at least one second valid element except for the first valid element is included in the compressed data according to a second rule.

The second valid element may denote remaining valid elements except for the first valid element in each row. For example, the second valid elements in FIG. 4 may be E2, E4, E8, E10, and E12.

As an example, the second rule may be a rule for allocating element value information of the second valid element and column distance information from the second valid element to a valid element ahead of the second valid element to the compressed data. For example, in FIG. 4, the processor 220 may allocate w2 (which is an element value of E2) and 4 (which is information about a column distance D from E2 to E1) to the compressed data. When an index bit is set to 4 bits, the processor 220 may thus express the column address of E2 as 0X4. As the data processing apparatus 200 expresses 4 which is column distance information of the second valid element instead of 6 which is column address information of the second valid element, the size of the compressed data may be significantly reduced over data of a typical neural network.

The processor 220 may generate compressed data so that the row address of the first valid element is included in the compressed data according to a third rule.

As an example, the third rule may be a rule for allocating row address information of the first valid element and an identification bit indicating the end of the row in which the first valid element is included to the compressed data. For example, in FIG. 4, the processor 220 may allocate 0 (which is a row address of E2) and 0XF (which is an identification bit) to compressed data. The identification bit 0XF may be set to the maximum value of the index bit. In other words, when decoding the compressed data, the processor 220 may allocate a maximum value to the index bit so that the termination of a row in which the first valid element is included is identified.

The processor 220 may generate the compressed data 420 in which only information of valid elements is included in the compressed data 420 (e.g., in which information of invalid elements is excluded in the compressed data 420). Accordingly, the first matrix data 410 may be compressed into the compressed data 420.

On the other hand, when the compressed data 420 is not read in units of rows, a case in which the column address information of a valid element and a row address may not be matched may occur when decoding the compressed data 420. Accordingly, the processor 220 may store the compressed data so that the valid elements of the first matrix data 410 may be read in units of rows. A method of storing compressed data will be described below with reference to FIG. 5.

Figure 5:
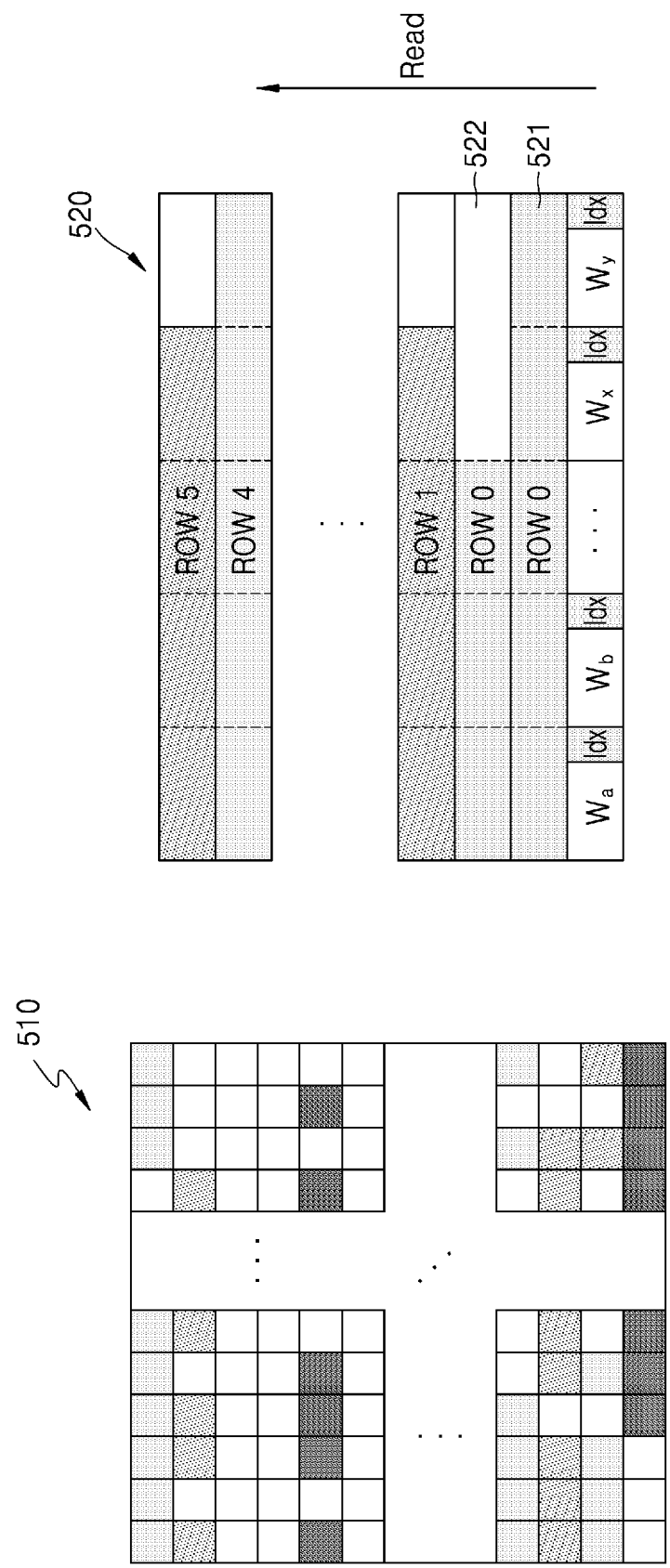
FIG. 5 illustrates a method of storing compressed data by a processor according to one or more embodiments.

FIG. 5 illustrates a method of storing compressed data by a processor according to one or more embodiments.

First matrix data 510 and compressed data 520 of FIG. 5 may respectively correspond to the first matrix data 410 and the compressed data 420 of FIG. 4.

Referring to FIG. 5, the processor 220 may store the compressed data 520 so that the valid elements of the first matrix data 510 may be read in units of rows.

The compressed data 520 may be stored in the memory 210 in units of preset chunks. In an example of a chunked storage layout, the compressed data 520 may be stored in equal-sized chunks of a pre-defined size. According to the number of valid elements included in the row, information of the valid elements included in a plurality of rows may be stored as one chunk or the information of the valid elements included in one row may be separately stored as a plurality of chunks.

In an embodiment, when information ROW0 of valid elements of any one row is separately stored in a first data chunk 521 and a second data chunk 522, the processor 220 may allocate an additional row bit to the index bit of the valid element having the largest column address among the information of the valid elements stored in the first data chunk 521. In another embodiment, when the information ROW0 of the valid elements of any one row is separately stored in the first data chunk 521 and the second data chunk 522, the processor 220 may allocate an additional row bit to the index bit of the valid element having the smallest column address among the information of the valid elements stored in the second data chunk 522. This is to identify that, when decoding compressed data, information of valid elements stored in the first data chunk 521 and the second data chunk 522 is information of valid elements included in the same row.

The first data chunk 521 may denote a data chunk including information of a valid element having the smallest column address among valid elements included in the same row. Also, the second data chunk 522 may denote a data chunk including remaining valid elements except for information of valid elements stored in the first data chunk 521.

When decoding the compressed data, the processor 220 may continuously read the second data chunk 522 after reading the first data chunk 521. Accordingly, the processor 220 may obtain row addresses and column addresses of valid elements.

On the other hand, when the data processing apparatus 200 is implemented in the form of PIM, the method of storing compressed data in units of rows described above allows a bank that has completed ahead a matrix vector multiplication operation of allocated valid elements to perform a matrix vector multiplication operation instead of another bank, which has not completed the matrix vector multiplication operation, and thus, it is possible to derive a load balancing effect. Hereinafter, a method of storing compressed data for load balancing will be further described with reference to FIGS. 6 and 7.

Figure 6:
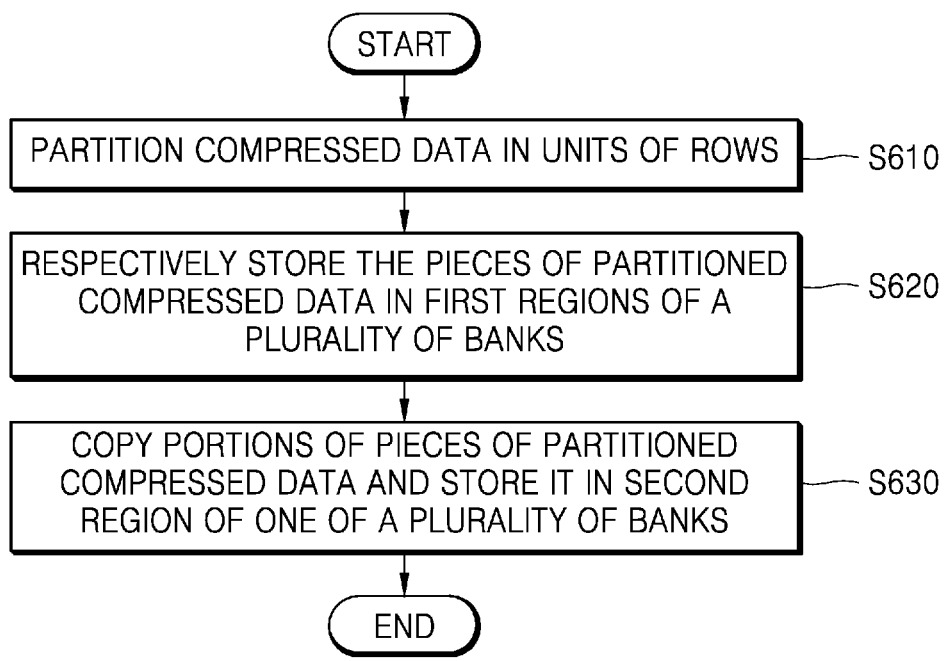
FIG. 6 illustrates a method of dividing and storing compressed data by a processor according to one or more embodiments.

FIG. 6 illustrates a method of partitioning and storing compressed data by a processor according to one or more embodiments.

Referring to FIG. 6, in operation S610, the processor 220 may partition compressed data in units of rows. Partitioning the compressed data into rows may denote that information of all valid elements included in one row is included in the partitioned compressed data.

In operation S620, the processor 220 may store the partitioned compressed data in a first region of a plurality of banks, respectively.

In operation S630, the processor 220 may copy a part of the partitioned compressed data and store the copied compressed data in a second region of one of the plurality of banks.

When a multiplication operation of the compressed data stored in the first region and second matrix data is completed, the processor 220 may initiate a multiplication operation of the compressed data stored in the second region and the first matrix data. A load of each processor 220 may be balanced as any one processor 220, which has completed the multiplication operation of the allocated valid elements ahead performs the multiplication operation of another processor 220, which has not completed the multiplication operation. A method of storing compressed data for load balancing of the processors 220 will be further described below with reference to FIG. 7.

Figure 7:
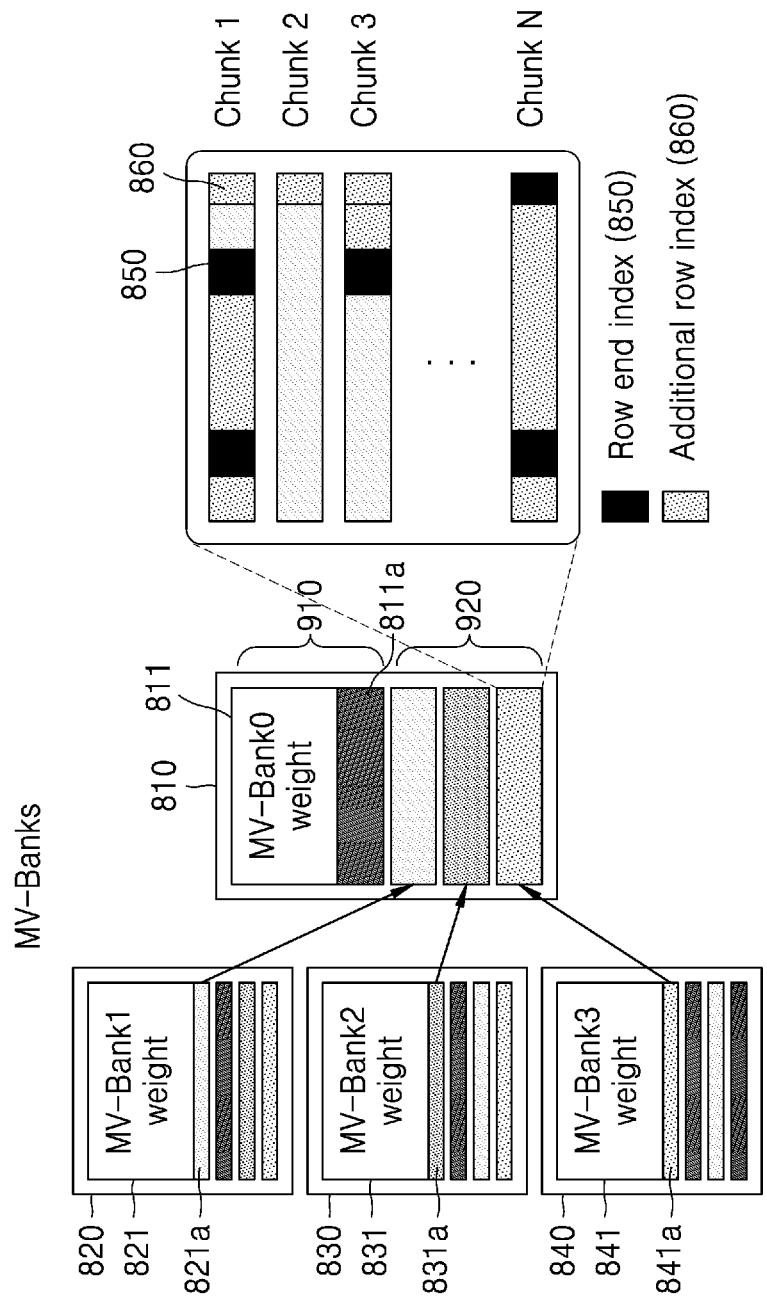
FIG. 7 illustrates a method of storing partitioned compressed data by a processor according to one or more embodiments.

FIG. 7 illustrates a method of storing partitioned compressed data by a processor according to one or more embodiments.

In FIG. 7, although four banks are shown, the number of banks may be less or more than four in some embodiments.

Referring to FIG. 7, the processor 220 may partition compressed data in units of rows. The partitioned compressed data may include information of all valid elements included in at least one row.

The processor 220 may store partitioned compressed data in a plurality of banks. For example, the processor 220 may store partitioned first compressed data 811 in a first bank 810, store partitioned second compressed data 821 in a second bank 820, store partitioned third compressed data 831 in a third bank 830, and store partitioned fourth compressed data 841 in a fourth bank 840. The partitioned first through fourth compressed data 811, 821, 831, and 841 may be stored in a first region 910 of each of the first through fourth banks 810, 820, 830, and 840.

The processor 220 may copy a part of the partitioned compressed data and store the copied compressed data in a second region of one of the first through fourth banks 810, 820, 830, and 840. For example, the processor 220 may copy a portion 821a of the partitioned second compressed data 821 and store it in a second region 920 of the first bank 810. Also, the processor 220 may copy a portion 831a of the partitioned third compressed data 831 and a portion 841a of the partitioned fourth compressed data 841 and may store them in the second region 920 of the first bank 810.

The compressed data stored in the second region 920 may also be stored so that information of valid elements is read in units of rows. As described above with reference to FIG. 5, when compressed data is partitioned and stored, the processor 220 may inform that the pieces of partitioned compressed data are connected by allocating an additional row bit 860 to an index bit of one valid element.

The processor 220 may compute an output vector by using compressed data and an input vector stored in the memory 210. A method of computing an output vector by the processor 220 will be further described below with reference to FIGS. 8 and 9.

Figure 8:
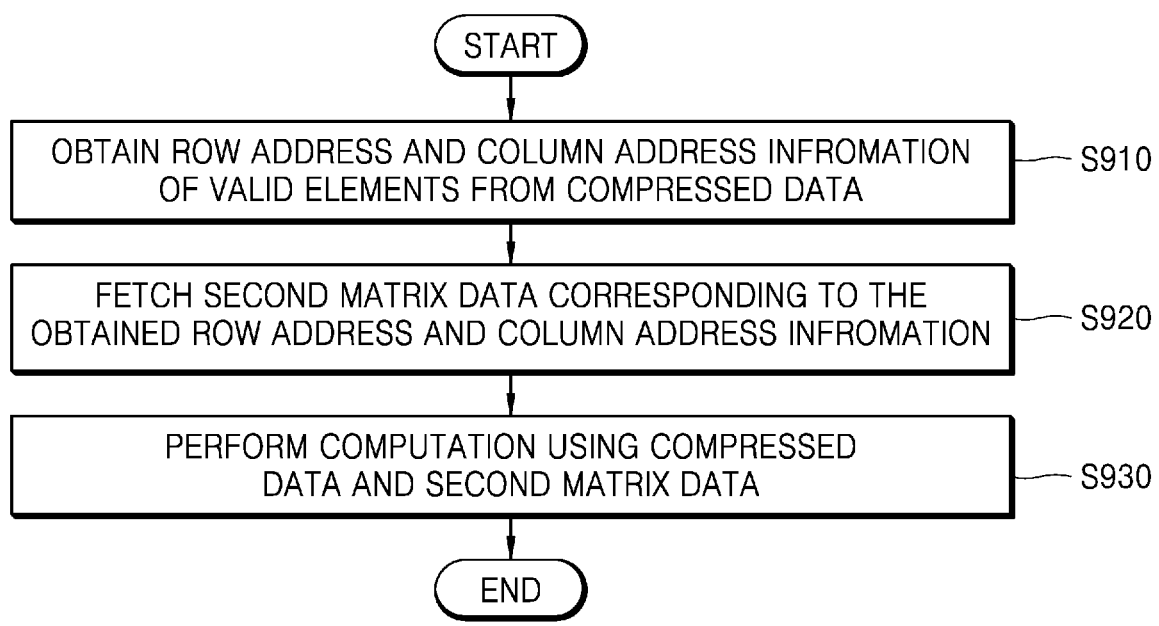
FIG. 8 illustrates a method of computing on output data by using compressed data by a processor according to one or more embodiments.

FIG. 8 illustrates a method of computing on output data by using compressed data by a processor according to one or more embodiments.

Referring to FIG. 8, in operation S910, the processor 220 may obtain row addresses and column addresses of valid elements from compressed data.

When the first valid element is compressed according to the first rule described with reference to FIG. 4, the processor 220 may obtain column address information stored in the compressed data as a column address of the first valid element.

Also, since the second valid elements are compressed according to the second rule described with reference to FIG. 4, the processor 220 may obtain, a sum of column distance information stored in the compressed data and column distance information of a previous valid element as column addresses of the second valid elements. For example, if column distance information of any valid element to be computed is 4 and column distance information of a previous valid element is 2, the processor 220 may compute a sum of 2 and 4 as 6 as a column address of a valid element.

Also, since a row address is compressed according to the third rule described with reference to FIG. 4, the processor 220 may obtain row addresses of valid elements based on the identification bit.

In operation S920, the processor 220 may fetch second matrix data corresponding to the obtained row address and column address. For example, when the second matrix data is a column vector and the obtained row address and column address are (1, 6), the processor 220 may fetch an element value of the second matrix data corresponding to (6, 1).

In operation S930, the processor 220 may perform a multiply and accumulation operation by using the compressed data and the second matrix data. In operation S920, since only element values of second matrix data corresponding to valid elements are fetched, the amount of computations of the processor 220 may be significantly reduced.

Figure 9:
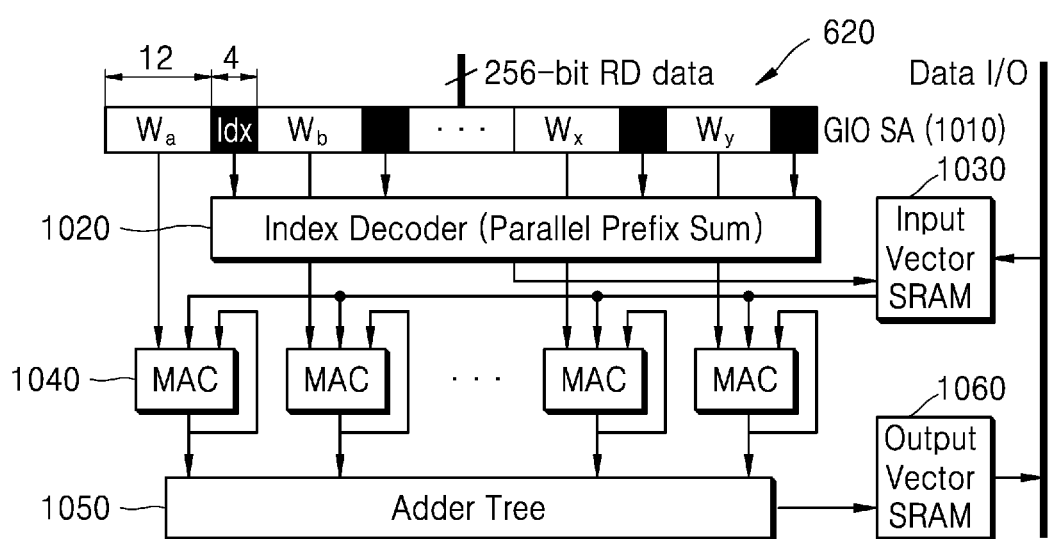
FIG. 9 illustrates a method of computing on output data by using compressed data by a processor according to one or more embodiments.

FIG. 9 illustrates a method of computing on output data by using compressed data by a processor according to one or more embodiments.

Referring to FIG. 9, a global input/output sense amplifier (GIO SA) 1010 may perform as a buffer for temporarily storing data 610 read from the memory 210. According to an embodiment, the GIO SA 1010 may be configured to store 256 bits of data corresponding to at least one row, and the GIO SA 1010 may receive read data of 256 bits (256-bit RD data) 610 from the memory 210. The 256-bit RD data 610 may be transferred to a MAC operator 1040 and used as an operand.

Meanwhile, the second matrix data which is another operand for computation may be input through a data input/output (Data I/O) path. The second matrix data may be stored in input vector static random access memory (SRAM) 1030 and then transferred to each MAC operator 1040.

Index bits may pass through an index decoder 1020 and may be transferred to the input vector SRAM 1030. In the case of the second valid element, the index decoder 1020 may compute a column address of a corresponding valid element by summing a column distance information stored in an index bit with column distance information of a previous valid element and may output a computed column address.

The input vector SRAM 1030 may fetch second matrix data based on the row address and the column address received from the index decoder 1020, and the fetched second matrix data may be input to the MAC operator 1040.

Each MAC operator 1040 may perform a computation on the compressed data and the second matrix data transmitted from the input vector SRAM 1030 and may output the result of the computation. The results of the computation output from each MAC operator 1040 may be summed up through an adder tree 1050, and an output vector corresponding to a final computation result may be stored in output vector SRAM 1060. An output vector stored in the output vector SRAM 1060 may be output to the outside through the Data I/O, and may be re-used for computation through the input vector SRAM 1030.

The data processing apparatuses, memories, processors, GIO SAs, index decoders, SRAMs, MAC operators, adder trees, data processing apparatus 200, memory 210, processor 220, GIO SA 1010, index decoder 1020, SRAM 1030, MAC operator 1040, adder tree 1050, SRAM 1060, and other apparatuses, units, modules, devices, and other components described herein with respect to FIGS. 1-9 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented data processing method, the method comprising:
generating compressed data of first matrix data based on information of a distance between valid elements included in the first matrix data;
fetching second matrix data based on the compressed data; and
generating output matrix data based on the compressed data and the second matrix data.

2. The method of claim 1, wherein the generating of the compressed data comprises:
generating the compressed data so that information of a first valid element, among elements included in a same row of the first matrix data, is included in the compressed data; and
generating the compressed data so that information of a second valid element, among the elements included in the same row of the first matrix data, is included in the compressed data.

3. The method of claim 2, wherein
the generating of the compressed data so that information of the first valid element is included in the compressed data comprises allocating element value information and column address information of the first valid element to the compressed data, and the generating of the compressed data so that information of the second valid element is included in the compressed data comprises allocating element value information of the second valid element and column distance information, indicating a column distance from the second valid element to a valid element having a smaller column address than a column address of the second valid element, to the compressed data.

4. The method of claim 1, wherein the generating of the compressed data comprises generating the compressed data so that the row address of the first valid element is included in the compressed data.

5. The method of claim 4, wherein the generating of the compressed data so that the row address of the first valid element is included in the compressed data comprises allocating row address information of the first valid element and an identification bit indicating an end of a row including the first valid element to the compressed data.

6. The method of claim 1, further comprising storing the generated compressed data so that the valid elements of the first matrix data are configured to be read in units of rows.

7. The method of claim 6, wherein the storing of the compressed data comprises:
partitioning the compressed data into rows; and
respectively storing pieces of the partitioned compressed data in first regions of a plurality of banks.

8. The method of claim 7, wherein the storing of the compressed data further comprises copying portions of the pieces of the partitioned compressed data stored in the first regions and storing the portions in a second region of one of the plurality of banks.

9. The method of claim 1, wherein the fetching of the second matrix data comprises:
obtaining row address and column address information of the valid elements from the compressed data; and
fetching element value information of the second matrix data corresponding to the obtained row address and column address.

10. The method of claim 9, wherein the obtaining of the row address and column address information comprises:
obtaining column address information of a first valid element stored in the compressed data, and
obtaining column address information of a second valid element by summing column distance information stored in the compressed data with column distance information of a valid element having a smaller column address than a column address of the second valid element.

11. The method of claim 1, wherein the generating of the compressed data comprises performing a multiply and accumulation (MAC) operation using the compressed data and the second matrix data.

12. A non-transitory computer-readable storage medium storing instruction that, when executed by one or more processors, configure the one or more processors to perform the method of claim 1.

13. A data processing apparatus comprising:
a memory; and
one or more processors configured to:
generate compressed data of first matrix data based on information of a distance between valid elements included in the first matrix data;
fetch an input vector based on the compressed data; and
generate output matrix data based on the compressed data and the second matrix data.

14. The data processing apparatus of claim 13, wherein, for the generating of the compressed data, the one or more processors are configured to:
generate the compressed data so that information of a first valid element, among elements included in a same row of the first matrix data, is included in the compressed data;
generate the compressed data so that information of a second valid element, among the elements included in the same row of the first matrix data, is included in the compressed data; and
generate the compressed data so that a row address of the first valid element is included in the compressed data.

15. The data processing apparatus of claim 14, wherein
the generating of the compressed data so that information of the first valid element is included in the compressed data comprises allocating element value information and column address information of the first valid element to the compressed data,
the generating of the compressed data so that information of the second valid element is included in the compressed data comprises allocating element value information of the second valid element and column distance information, indicating a column distance from the second valid element to a valid element having a smaller column address than a column address of the second valid element, to the compressed data, and
the generating of the compressed data so that the row address of the first valid element is included in the compressed data comprises allocating row address information of the first valid element and an identification bit indicating an end of a row including the first valid element to the compressed data.

16. The data processing apparatus of claim 13, wherein the memory is configured to store the generated compressed data so that the valid elements of the first matrix data are configured to be read in units of rows.

17. The data processing apparatus of claim 16, wherein, for the storing of the compressed data, the memory is configured to:
partition the compressed data into units of rows; and
respectively store the pieces of the partitioned compressed data in first regions of a plurality of banks.

18. The data processing apparatus of claim 17, wherein, for the storing of the compressed data, the memory is configured to copy portions of the pieces of the partitioned compressed data stored in the first regions and store the portions in a second region of one of the plurality of banks.

19. The data processing apparatus of claim 13, wherein the one or more processors are configured to:
obtain row addresses and column address information of the valid elements from the compressed data; and
fetch element value information of the second matrix data corresponding to the obtained row address and column address.

20. The data processing apparatus of claim 13, wherein the one or more processors are configured to perform a multiply and accumulation (MAC) operation using the compressed data and the input vector.

* * * * *